(12) United States Patent
Cai et al.

(10) Patent No.: US 9,491,675 B2
(45) Date of Patent: Nov. 8, 2016

(54) POLICY ENGINE IN MOBILE UNIT FOR ENHANCED FEMTOCELL HANDOVER

(71) Applicant: Alcatel-Lucent USA Inc., Murray Hill, NJ (US)

(72) Inventors: Yigang Cai, Naperville, IL (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 17 days.

(21) Appl. No.: 14/501,628

(22) Filed: Sep. 30, 2014

(65) Prior Publication Data

US 2016/0095031 A1 Mar. 31, 2016

(51) Int. Cl.
*H04W 36/08* (2009.01)
(52) U.S. Cl.
CPC .................................... *H04W 36/08* (2013.01)
(58) Field of Classification Search
CPC .................................................... H04W 36/08
See application file for complete search history.

(56) References Cited

U.S. PATENT DOCUMENTS

| | | | |
|---|---|---|---|
| 8,170,559 B1 * | 5/2012 | Hsieh et al. | 455/436 |
| 2010/0041365 A1 * | 2/2010 | Lott | G06Q 30/016 455/406 |
| 2010/0113032 A1 * | 5/2010 | Lee et al. | 455/437 |
| 2011/0105129 A1 * | 5/2011 | Kim | H04W 36/0083 455/443 |
| 2011/0269441 A1 * | 11/2011 | Silver | 455/418 |
| 2013/0034081 A1 * | 2/2013 | Ban | H04W 36/16 370/331 |
| 2013/0157652 A1 * | 6/2013 | Khaitan et al. | 455/422.1 |
| 2014/0045505 A1 * | 2/2014 | Henry et al. | 455/444 |

FOREIGN PATENT DOCUMENTS

WO WO 2009/071693 * 6/2009
WO WO 2009/071693 A1 * 6/2009 ............ H04W 48/20

* cited by examiner

*Primary Examiner* — Brandon Miller
(74) *Attorney, Agent, or Firm* — Duft Bornsen & Fettig, LLP

(57) ABSTRACT

A mobile unit preselects candidate femtocells for handover. The mobile unit reports candidate femtocells and associated measurement data to the network. The network analyzes the preselected candidate femtocells and provides a list of handover femtocells for the mobile unit to use. This list can be the same or different than the preselected list.

19 Claims, 2 Drawing Sheets

POLICY ENGINE IN MOBILE UNIT FOR ENHANCED FEMTOCELL HANDOVER

FIELD OF THE INVENTION

The present invention relates generally to communication systems.

BACKGROUND OF THE INVENTION

Femtocell handover, i.e., handover or handoff to and from femtocells, is important in cellular networks. Such handovers are expected to be seamless and advantageous from a service-provider as well as subscriber perspective. The handover involving macrocells and femtocells is complicated and many factors are considered before such handovers can take place. There usually are a large number of femtocells in the coverage area of a macrocell and due consideration should be made prior to handing off to a femtocell.

In current communication systems, the decision of whether to hand off to a different femtocell is made by the network. This can be problematic in the case when a subscriber has a preference as to which femtocell to handoff to. In current systems, since the handover decision is made by the network, user preference is completely disregarded.

In addition, the mobile unit currently sends information about a large number of femtocells to the network in order for the network to make a decision. In current handover situations, a mobile unit must communicate with a large number of femtocells, gather information about these femtocells, and report this information to the network. This is the pre-handover procedure which consists of pre-authentication and security confirmation.

As can be seen, current methods of handover do not take user preferences into account and force mobile units to gather and transmit large amounts of information about the femtocells to which they can communicate with.

Therefore, a need exists for a better way of performing handovers to femtocells that alleviates these problems and provides for a better experience for the user and less congestion on the network.

BRIEF SUMMARY OF THE INVENTION

In accordance with an exemplary embodiment, a mobile unit preselects candidate femtocells for handover. The mobile unit reports candidate femtocells and associated measurement data to the network. The network can analyze the preselected candidate femtocells and provide a list of handover femtocells for the mobile unit to use. This list can be the same or different than the preselected list.

DETAILED DESCRIPTION OF THE INVENTION

Figure 1:
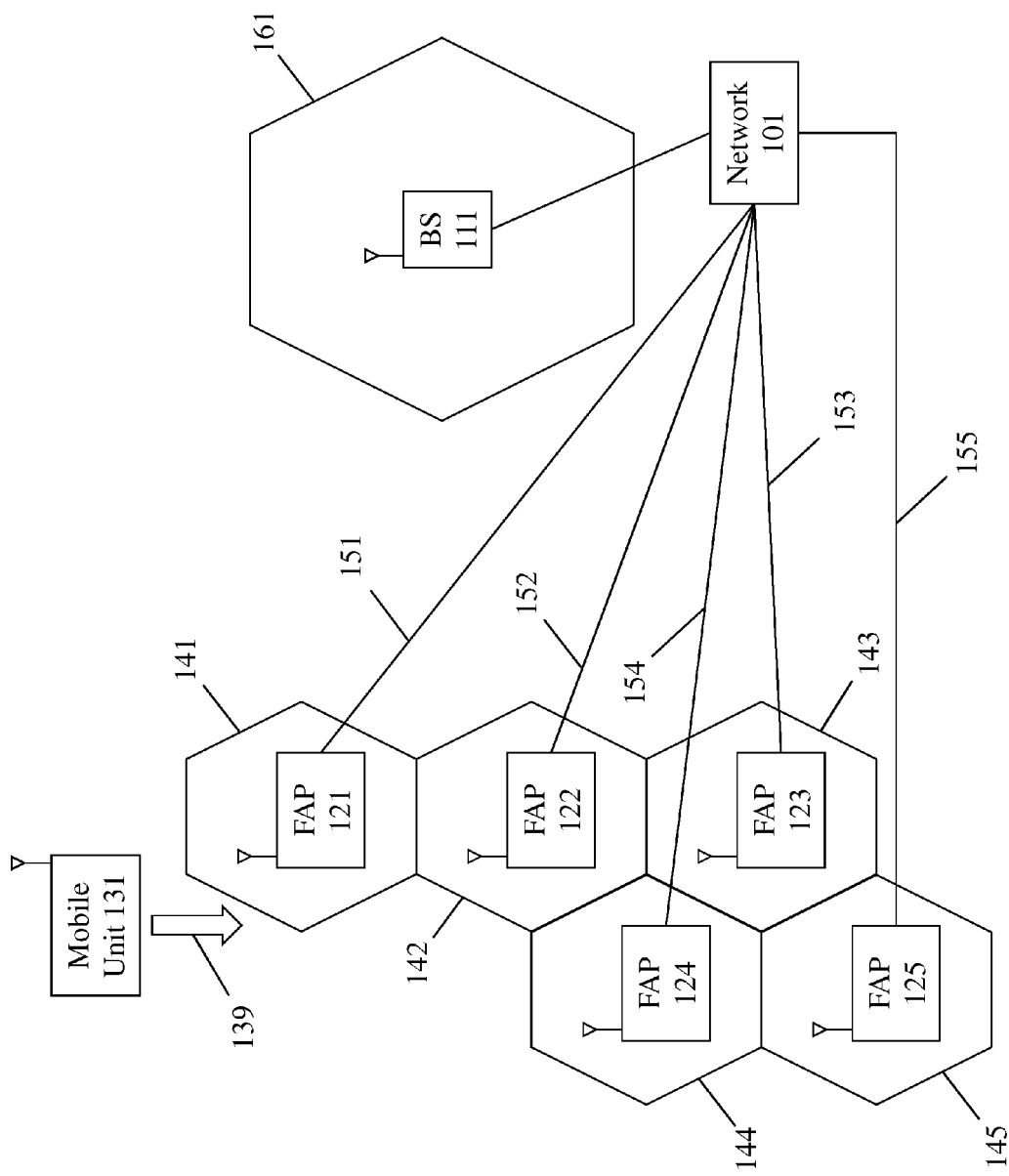
FIG. 1 depicts the functional architecture of a communication network in accordance with an exemplary embodiment of the present invention.

FIG. 1 depicts the functional architecture of a communication network 100 in accordance with an exemplary embodiment of the present invention. An exemplary embodiment of the present invention proposes an improved ability for a mobile unit to improve the handoff process by making some of the handoff decisions. In accordance with an exemplary embodiment, the mobile unit pre-selects candidate handover femtocells, and reports a list of candidate femtocell measurement data to the network. The network then preferably feeds multiple possible target handover femtocells to the mobile unit, using, for example, Quality of Service (QoS) and associated information, for facilitating handover target selection.

Communication network 100 preferably includes network 101, base station 111, Femto Access Points (FAPs) 121-125, and mobile unit 131. It should be understood that femtocells are often referred to as Metro Cells or Small Cells. The terms are used interchangeably herein. It should also be understood that additional network elements can be included in communication network 100, but only these elements are depicted for clarity.

Network 101 is a wireless communication network that provides subscribers the ability to place and receive calls to other communication units. Network 101 can utilize any wireless network protocol, including but not limited to 3G, WCDMA, CDMA2000, LTE and WiMAX.

Base station 111 provides radio coverage within a macrocell 161.

FAPs 121-125 are small cellular telephone base stations that provide radio coverage within microcell 141-145, respectively. FAPs 121-125 connect with network 101 via broadband connections 151-155, respectively. FAPs allow a service provider to extend the coverage for communication network 100. FAPs provide the enhanced ability to provide improved coverage and also increased capacity. In accordance with a first exemplary embodiment, network 101 is a 3G network and FAPs 121-125 are Home Node B (HNB) femtocells. In accordance with a second exemplary embodiment, network 101 is an LTE network and FAPs 121-125 are Home eNodeB (HeNB) femtocells.

FAPs 121-125 preferably include enhanced functionality, such as radio resource control functions. This allows FAPs 121-125 greater autonomy and the ability to self-configure and self-optimize. FAPs 121-125 are preferably connected to network 101 over broadband IP connections 151-155 using broadband IP, such as DSL or cable modems.

Mobile unit 131 includes an interface, a receiver, a transmitter, a processor, and memory. The interface is effective in receiving user input regarding criteria configuration.

In accordance with an exemplary embodiment, the processor includes a policy engine. The policy engine receives user criteria related to handover selection and makes recommendations of potential handover femtocell candidates. The criteria can be entered by a user of mobile unit 131, can be received from network 101, or can be a combination of the two.

In accordance with an exemplary embodiment, mobile unit 131 is traveling in a direction indicated by arrow 139. Mobile unit 131 will therefore be entering and leaving multiple coverage areas provided by multiple femtocells.

Figure 2:
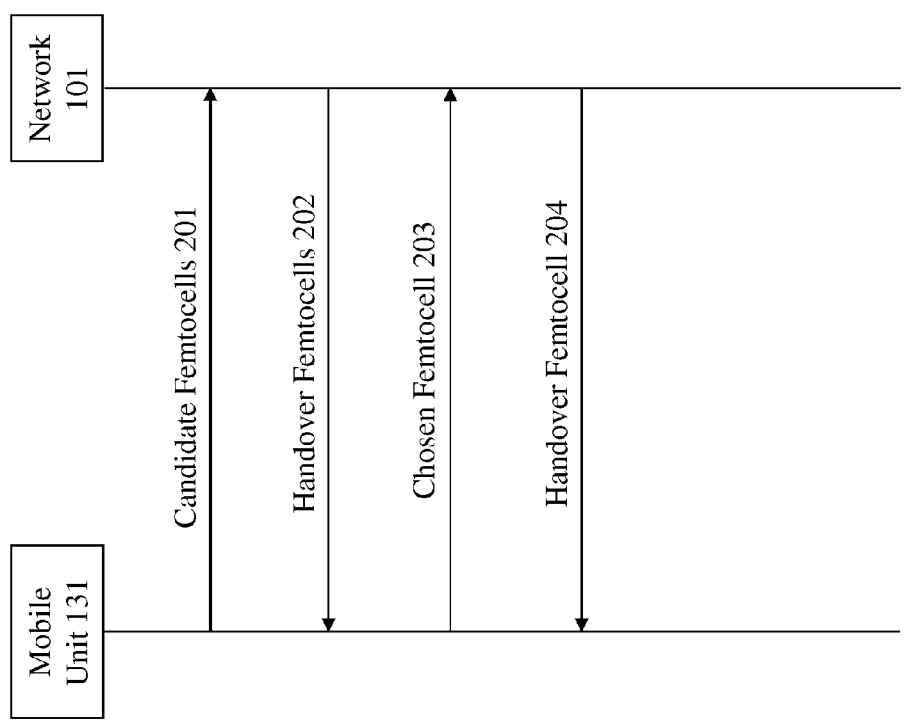
FIG. 2 depicts a call flow diagram in accordance with an exemplary embodiment of the present invention.

FIG. 2 depicts a call flow diagram 200 in accordance with an exemplary embodiment of the present invention. In accordance with this exemplary embodiment, an enhanced policy function within mobile unit 131 is provided for femtocell handover. Mobile unit 131 pre-selects a list of candidate femtocells, preferably based on its own evaluation of enhanced criteria for femtocell handover. Mobile unit 131 sends the list of candidate femtocells to network 101. In accordance with an exemplary embodiment, network 101 sends multiple handover target femtocells to mobile unit 131, including information related to the handover target femtocells.

When there is coverage of both macrocell and femtocells in an area, mobile unit 131 will be able to make a decision whether to initiate handover to a femtocell. For example, if mobile unit 131 is moving at a high speed, even with a strong femtocell signal it would be unwise to affect a handover because such handovers would be frequent under the circumstances. Currently, this decision is made by the backhaul network, but an exemplary embodiment of the present invention moves this decision to mobile unit 131.

Further, if neighboring FAPs are not preferred by mobile unit 131, mobile unit 131 should remain connected to the macrocell without handing over to the non-preferred femtocells. In this scenario in an exemplary embodiment of the present invention, mobile unit 131 does not report measurement data to network 101.

In an exemplary embodiment, mobile unit 131 is moving through communication system 100, which includes both femtocells and macrocells. Mobile unit 131 utilizes the policy engine within mobile unit 131 to evaluate the current conditions of mobile unit 131 and neighboring FAPs against policies and criteria pre-defined within mobile unit 131.

In this exemplary embodiment, the policy engine within mobile unit 131 determines a list of preferred candidate femtocells with which a handover would be acceptable. The policy engine can use a single or multiple criteria to determine the list of preferred candidate handover cells.

For example, one criterion that can be used is signal-to-noise ratio (SNR). If mobile unit 131 is currently connected to a cell, whether a macrocell or a femtocell, that has a worse SNR than a potential cell, then the policy engine would put that potential cell on the preferred candidate handover cell list.

A further criterion that the policy engine can use is whether mobile unit 131 is moving and if so at what speed. In this case, the policy engine would avoid handovers when mobile unit 131 is travelling at a speed faster than a predetermined threshold.

A further criterion that the policy engine can use is energy efficiency based on the proximity of mobile unit 131 to the cell.

A further criterion that the policy engine can consider is the location of mobile unit 131. For example, if mobile unit 131 is at or near home and has a femtocell at his residence, the policy engine will select the resident femtocell as the handover candidate. In an exemplary embodiment, the policy engine will make the resident femtocell the only handover candidate, which will ensure that mobile unit 131 will hand over to the resident femtocell. Similarly, if mobile unit 131 is within the range of a femtocell on the user's school campus, the policy engine will make the school femtocell the only handover candidate, which will ensure that mobile unit 131 will hand over to the school femtocell.

A further criterion that the policy engine can consider is the tariff rate. If mobile unit 131 is currently roaming in network that is not the home network of mobile unit 131, the policy engine will prefer the home network of mobile unit 131 and add any femtocells that are part of the home network to the handover candidate femtocells list. This will save mobile unit 131 roaming and other usage fees from the non-home network.

A further criterion that the policy engine can consider is ownership of the FAP. Service providers prefer their customers to utilize cells that the service provider owns.

A further criterion that the policy engine can consider is when a store or other business establishment offers a femtocell for connectivity. In this case, the store may offer enhanced service, coupons, loyalty bonuses, or other enticements to those utilizing the store's femtocells. In such a case, the user of mobile unit 131 may want to connect and stay connected to the femtocell owned by the store. However, if mobile unit 131 detects reliability issues with specific FAPs offered at certain stores, the policy engine can take these reliability issues into account and remove the FAP of that store from the handover candidate femtocell list.

After considering one or more of the above criteria, the policy engine creates a list of candidate femtocells that would be acceptable for handoff. The list can be ranked or presented in no particular order. This list of candidate femtocells is inserted into Candidate Femtocells message 201 and sent from mobile unit 131 to network 101. Candidate Femtocells message 201 can also include measurement data associated with each of the candidate femtocells.

Network 101 receives Candidate Femtocells message 201. Network 101 retrieves the list of candidate femtocells and their associated measurements from Candidate Femtocells message 201. In a first exemplary embodiment, network 101 utilizes the list of candidate femtocells and their associated measurements to determine which femtocell is to be the target handover femtocell.

In a further exemplary embodiment, network 101 utilizes the list of candidate femtocells and their associated measurements in addition to additional factors to determine which femtocell is to be the target handover femtocell. These factors can include user type, access mode, small coverage, and radio resource control. In addition, network 101 can also utilize femtocell security, energy efficiency of the radio access, load balancing, bandwidth, the location of mobile unit 131, the speed of mobile unit 131, and subscriber account data for mobile unit 131. The subscriber account data can include, for example, charging rules and tariff rate in both networks.

Network 101 sends Handover Femtocells message 202 to mobile unit 131. In a first exemplary embodiment, Handover Femtocells message 202 includes multiple femtocells that network 101 has chosen for mobile unit 131 to handover to. Handover Femtocells message 202 also preferably includes additional information relating to the chosen femtocells; for example, QoS, tariff and other charging policy information. The selected femtocells are preferably in the order that network 101 thinks is best for mobile unit 131 to handover to. The order may or may not be in the same priority order ranking as reported by mobile unit 131 in Candidate Femtocells message 201.

In a further exemplary embodiment, network 101 may send a single femtocell for mobile unit 131 to handover to.

Mobile unit 131 receives Handover Femtocells message 202 and extracts the femtocell list and additional information relating to the chosen femtocells. If the femtocell list includes a single femtocell, mobile unit 131 hands over to that femtocell.

If the femtocell list includes multiple femtocells, the policy engine within mobile unit 131 processes the femtocell list to make a final determination of the femtocell to handover to.

Mobile unit 131 sends Chosen Femtocell message 203 to network 101. Chosen Femtocell message 203 includes the femtocell that Mobile Unit 131 plans to handoff to.

Network 101 receives Chosen Femtocell message 203 from mobile unit 131 and completes the procedure of handing mobile unit 131 off to the chosen femtocell.

Network 101 sends Handover Femtocell message 204 to mobile unit 131 to instruct mobile unit 131 of the handover.

An exemplary embodiment thereby provides for a mobile unit to preselect candidate femtocells for handover and report these preselected femtocells to the network. The network processes the received femtocells and feeds multiple target femtocells back to the mobile unit, preferably with QoS and associated information. This information facilitates handover target selection in the mobile unit.

A subscriber utilizing a mobile unit understands his or her needs better than anyone else, including the network. Putting the subscriber in charge for the policy decision concerning handover to favor a stronger signal, a better rate, less congestion, better QoS, best-effort delivery apt for casual usage, etc., is important and will provide enhanced service and customer satisfaction with the network.

While this invention has been described in terms of certain examples thereof, it is not intended that it be limited to the above description, but rather only to the extent set forth in the claims that follow.

We claim:

1. A mobile unit comprising:
    an interface for receiving user input regarding user criteria for preselecting at least one candidate femtocell for handover;
    a processor including a policy engine for preselecting a list of candidate femtocells preferred by a user of the mobile unit for handover by evaluating the user criteria;
    a transmitter for transmitting the list of candidate femtocells to a network; and
    a receiver for receiving a handover femtocells message from the network, wherein the handover femtocells message includes a list of target femtocells chosen by the network for the mobile unit for handover based on the list of candidate femtocells provided by the mobile unit;
    wherein the policy engine selects one of the femtocells for handover from the list of target femtocells;
    wherein the policy engine preselects the list of candidate femtocells based on movement of the mobile unit.

2. A method for performing handover of a mobile unit to a femtocell, the method comprising:
    receiving, in the mobile unit, user input regarding user criteria for preselecting at least one candidate femtocell for handover;
    preselecting, in the mobile unit, a list of candidate femtocells preferred by a user of the mobile unit for handover by evaluating the user criteria;
    transmitting the list of candidate femtocells from the mobile unit to a network;
    receiving a handover femtocells message at the mobile unit from the network, wherein the handover femtocells message includes a list of target femtocells chosen by the network for the mobile unit for handover based on the list of candidate femtocells provided by the mobile unit;
    selecting one of the femtocells for handover from the list of target femtocells; and
    handing off the mobile unit to the selected femtocell;
    wherein the step of preselecting a list of candidate femtocells comprises preselecting the list of candidate femtocells based on movement of the mobile unit.

3. A method in accordance with claim 2, wherein the step of transmitting the list of candidate femtocells to a network comprises transmitting additional information relating to the list of candidate femtocells.

4. A method in accordance with claim 3, wherein the additional information comprises Quality of Service.

5. A method in accordance with claim 3, wherein the additional information comprises tariff information.

6. A method in accordance with claim 3, wherein the additional information comprises charging policy information.

7. A method in accordance with claim 2, wherein the list of candidate femtocells is ranked in a preferred handover order.

8. A method in accordance with claim 2, wherein the list of target femtocells is ranked in a priority order determined by the network.

9. A method in accordance with claim 2, wherein the list of candidate femtocells includes measurement data associated with each of the candidate femtocells.

10. A method in accordance with claim 2, wherein the step of preselecting a list of candidate femtocells comprises preselecting the list of candidate femtocells based on signal-to-noise ratio (SNR) between the mobile unit and a candidate femtocell.

11. A method in accordance with claim 2, wherein the step of preselecting a list of candidate femtocells based on movement of the mobile unit comprises preselecting only when the mobile unit is traveling at a speed that is below a predetermined threshold.

12. A method in accordance with claim 2, wherein the step of preselecting a list of candidate femtocells comprises preselecting the list of candidate femtocells based on proximity of the mobile unit to a candidate femtocell.

13. A method in accordance with claim 2, wherein the step of preselecting a list of candidate femtocells comprises preselecting the list of candidate femtocells based on the location of the mobile unit.

14. A method in accordance with claim 13, wherein the location of the mobile unit comprises a location at or near the residence of the user of the mobile unit.

15. A method in accordance with claim 14, wherein when the mobile unit is in range of a home femtocell, the mobile unit makes the home femtocell the only femtocell in the list of candidate femtocells.

16. A method in accordance with claim 14, wherein when the mobile unit is in range of a school femtocell associated with a school, the mobile unit makes the school femtocell the only femtocell in the list of candidate femtocells.

17. A method in accordance with claim 2, wherein the step of preselecting a list of candidate femtocells comprises preselecting the list of candidate femtocells based on a tariff rate for a candidate femtocell.

18. A method in accordance with claim 2, wherein the step of preselecting a list of candidate femtocells comprises preselecting the list of candidate femtocells based on ownership of a candidate femtocell.

19. An apparatus comprising:
    a mobile unit in range of a network that includes a macrocell base station and Femto Access Points (FAP) that provide multiple femtocells;
    the mobile unit is configured to receive user input regarding user criteria for preselecting at least one candidate femtocell for handover, to preselect a list of candidate femtocells preferred by a user of the mobile unit for handover by evaluating the user criteria, to transmit the list of candidate femtocells to the macrocell base station, and to receive a list of target femtocells from the macrocell base station, wherein the list of target femtocells was chosen by the network for the mobile unit for handover based on the list of candidate femtocells provided by the mobile unit;
the mobile unit is configured to select one of the femtocells for handover from the list of target femtocells;
wherein the mobile unit preselects the list of candidate femtocells based on movement of the mobile unit.

\* \* \* \* \*